United States Patent
Earle (10) Patent No.: US 8,033,558 B2
(45) Date of Patent: Oct. 11, 2011

(54) BICYCLE REAR SUSPENSION SYSTEM

(75) Inventor: David Earle, Watsonville, CA (US)

(73) Assignee: A-Pro Tech Co., Ltd., Taichung Hsien (TW)

( * ) Notice: Subject to any disclaimer, the term of this patent is extended or adjusted under 35 U.S.C. 154(b) by 26 days.

(21) Appl. No.: 12/073,717

(22) Filed: Mar. 10, 2008

(65) Prior Publication Data

US 2009/0072512 A1  Mar. 19, 2009

(30) Foreign Application Priority Data

Sep. 19, 2007  (TW) ................. 96134964 A (51) Int. Cl.
*B62K 3/02* (2006.01)
(52) U.S. Cl. ......... 280/284; 280/283; 280/288; 280/275
(58) Field of Classification Search ................ 280/283, 280/284, 275, 288
See application file for complete search history.

(56) References Cited

U.S. PATENT DOCUMENTS

| | | | | |
|---|---|---|---|---|
| 944,795 | A * | 12/1909 | Leet et al. | 280/284 |
| 1,047,430 | A * | 12/1912 | Michaelson | 280/284 |
| 2,863,672 | A * | 12/1958 | Murata | 280/283 |
| 3,974,892 | A * | 8/1976 | Bolger | 180/227 |
| 5,611,557 | A * | 3/1997 | Farris et al. | 280/275 |
| 5,772,228 | A * | 6/1998 | Owyang | 280/284 |
| 5,826,899 | A * | 10/1998 | Klein et al. | 280/284 |
| 6,036,213 | A * | 3/2000 | Busby | 280/284 |
| 6,843,494 | B2 * | 1/2005 | Lam | 280/284 |
| 6,886,846 | B2 * | 5/2005 | Carroll | 280/284 |
| 7,100,930 | B2 * | 9/2006 | Saiki | 280/284 |
| 7,413,208 | B2 * | 8/2008 | Weng | 280/284 |
| 7,427,077 | B2 * | 9/2008 | Lesage et al. | 280/284 |
| 7,494,146 | B2 * | 2/2009 | Tseng | 280/284 |
| 2004/0061305 | A1 * | 4/2004 | Christini | 280/284 |
| 2004/0070169 | A1 * | 4/2004 | Lesage et al. | 280/284 |
| 2004/0094933 | A1 * | 5/2004 | Probst | 280/284 |
| 2005/0253357 | A1 * | 11/2005 | Chang et al. | 280/283 |
| 2006/0119070 | A1 * | 6/2006 | Weagle | 280/284 |
| 2007/0108725 | A1 * | 5/2007 | Graney | 280/284 |
| 2008/0054595 | A1 * | 3/2008 | Lu | 280/284 |

* cited by examiner

*Primary Examiner* — Kevin Hurley
*Assistant Examiner* — Maurice Williams
(74) *Attorney, Agent, or Firm* — Rosenberg, Klein & Lee (57) ABSTRACT

A bicycle rear suspension system includes a front part including a top tube, a down tube, a head tube and a seat tube. A rear part of the bicycle rear suspension system includes two seat stays and two chain stays. The seat stays have first ends pivotally connected to the dropouts on the first ends of the chain stays and two second ends pivotally connected to a first end of a connection member at a first pivot point. Two second ends of the chain stays are pivotally connected to a bridge between the down tube and the seat tube. A second end of the connection member is pivotally connected to the top tube. A cylinder has a first end pivotally connected to the bridge and a second end pivotally connected to a mediate portion of the connection member at a second pivot point.

5 Claims, 12 Drawing Sheets

(Prior Art)

Fig. 9

(Prior Art)

Fig.10

(Prior Art)

Fig.11

(Prior Art)

Fig.12

(Prior Art)

Fig.13

(Prior Art)

Fig.14

(Prior Art)

Fig.15

(Prior Art)

Fig.16
(Prior Art)

BICYCLE REAR SUSPENSION SYSTEM

FIELD OF THE INVENTION

The present invention relates to a bicycle rear suspension system which absorbs shocks by pivoting the rear part of the bicycle frame.

BACKGROUND OF THE INVENTION

FIG. 8 to FIG. 11 show prior art to this invention. Prior art in this category is comprised of a front section known as a front triangle and a rear section known as a rear triangle. The rear triangle is connected to the front triangle using any number of connection methods which may or may not employ bearings, bushings, axles, clamps and flexible links. A shock absorbing unit is connected between the front and the rear to allow the rear to move at a regulated rate with regard to the front. Any number of different connection methods for controlling the rate of movement can be used. The front section is typically but not in all cases comprised of a tube which carries the seat apparatus, a tube which carries the steering apparatus, and a tube which carries a crank and pedal assembly. These three tubes are connected together in any number of different ways to form the front section. The front section general prior art may have a single point of connection between the two (front and rear) or multiple points of connection using any number of different connection methods and pivot and or link configurations. The rear section is typically comprised of an apparatus/part to mount a wheel, considered in most cases the rear wheel, this apparatus/part is known as and will be referred to as a dropout. In most, but not all configurations, tubes will extend from the dropout forward, a typical (but not limited to) configuration incorporates a lower set of tubes constructing an arm member known as the chainstay arms and an upper set of tubes known as the seatstay arms. Typically, but not in all configurations, these arms will provide, at the opposite end of the dropouts, a location to mount the rear triangle to the front triangle, and/or a variety of links or members, consisting of, or not, bearings, bushings, axles, and/or clamps and other possible apparatus to provide rotation. Attachment to the front triangle can be at single or multiple location, dependant on the design, however there will be specifically a single pivot that will control the arc/movement of the chainstay arms and/or rear triangle, that the pivot will be considered and referred to as the main pivot. The front triangle will have a location which is considered the main pivot, and the rear triangle will have a means for attaching to this location.

Figure 12:
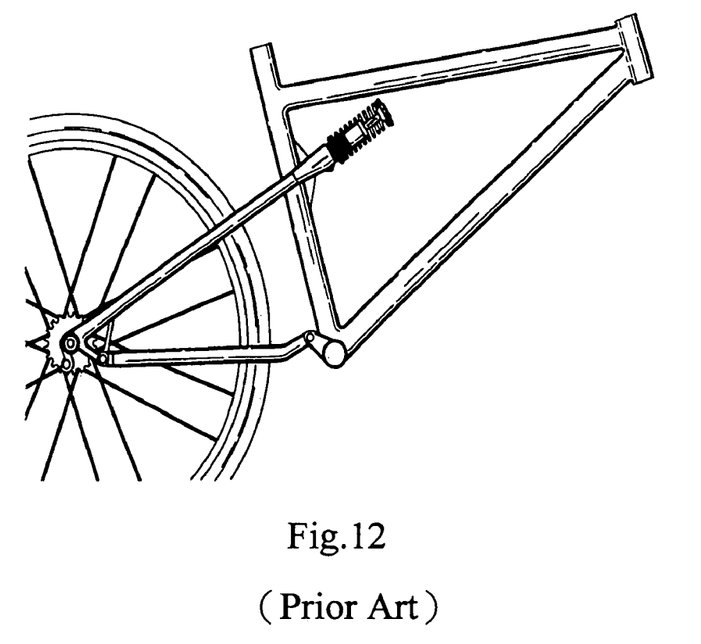
FIG. 12 shows a conventional bicycle rear suspension system.

FIG. 12 discloses another conventional suspension system known to applicant. This conventional suspension system is disclosed in U.S. Pat. No. 5,671,936, in which rear triangle movement is controlled by a shock absorbing unit which starts its movement (is at its lowest potential energy state) at its shortest length between attachment points and grows longer as the rear triangle moves to a higher potential energy state. Such a shock absorbing unit is commonly referred to as an extension (pull) shock.

Figure 13:
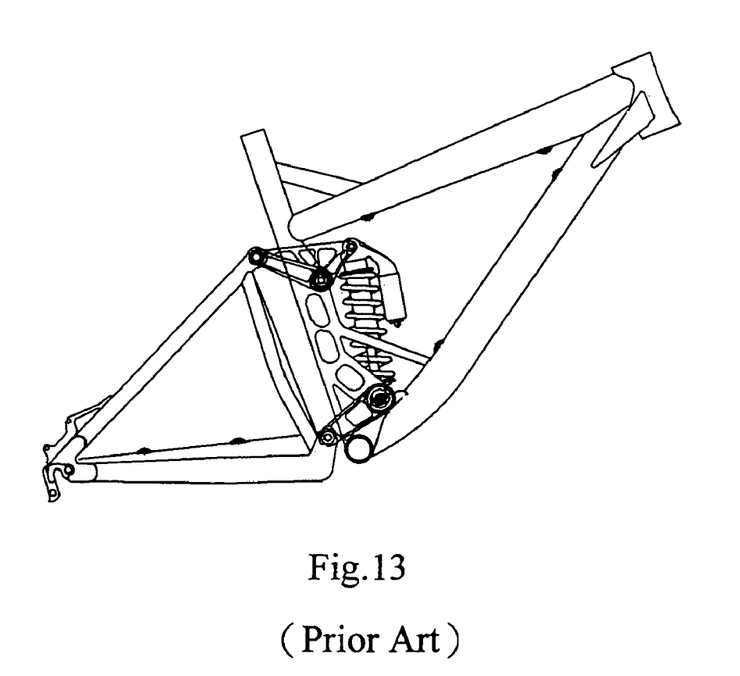
FIG. 13 shows a conventional bicycle rear suspension system.

FIG. 13 discloses another conventional suspension system known to applicant. The shown front section is known as a front triangle and a rear section known as a rear triangle. The rear triangle is connected to the front triangle using any number of connection methods which may or may not employ bearings, bushings, axles, clamps and flexible links. A shock absorbing unit is connected between the front and the rear to allow the rear to move at a regulated rate with regard to the front. Any number of different connection methods for controlling the rate of movement can be used. The front section is typically but not in all cases comprised of a tube which carries the seat apparatus, a tube which carries the steering apparatus, and a tube which carries a crank and pedal assembly. These three tubes are connected together in any number of different ways to form the front section. The front section general prior art may have a single point of connection between the two (front and rear) or multiple points of connection using any number of different connection methods and pivot and or link configurations. The rear section is typically comprised of an apparatus/part to mount a wheel, considered in most cases the rear wheel, this apparatus/part is known as and will be referred to as a dropout. In most, but not all configurations, tubes will extend from the dropout forward, a typical (but not limited to) configuration incorporates a lower set of tubes constructing an arm member known as the chainstay arms and an upper set of tubes known as the seatstay arms and/or a variety of links or members, consisting of, or not, bearings, bushings, axles, links and/or clamps and other possible apparatus to provide rotation. However direct connection of chainstay members/rear triangle to the main/lower pivot of the front triangle is not made, instead, some means of links/alternative connection is used to divide the front section and the chainstay member/rear section members. The front triangle will have a location which is considered the main pivot or lower pivot.

Figure 14:
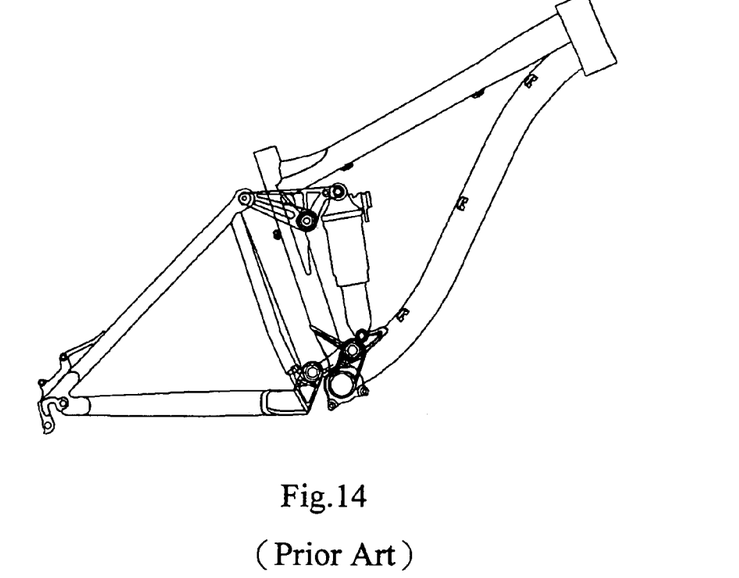
FIG. 14 shows a conventional bicycle rear suspension system.

FIG. 14 discloses another conventional suspension system known to applicant. Shown is a front section known as a front triangle and a rear section known as a rear triangle. The rear triangle is connected to the front triangle using any number of connection methods which may or may not employ bearings, bushings, axles, clamps, and flexible links. A shock absorbing unit is connected between the front and the rear to allow the rear to move at a regulated rate with regard to the front. Any number of different connection methods, links, pivots, etc, for controlling the rate of movement can be used. However the shock absorbing unit has one end that generally points to the tube that carries the crank and pedal assembly and is located generally in that area. The opposite end of the shock generally points in an upward direction. The shock is of compression (push) shock variety, specifically has a lower potential energy at the position which the ends of the shock are at the furthest distance apart. The front section is typically but not in all cases comprised of a tube which carries the seat apparatus, a tube which carries the steering apparatus, and a tube which carries a crank and pedal assembly. These three tubes are connected together in any number of different ways to form the front section. The front section general prior art may have a single point of connection between the two (front and rear) or multiple points of connection using any number of different connection methods and pivot and or link configurations. The rear section is typically comprised of an apparatus/part to mount a wheel, considered in most cases the rear wheel, this apparatus/part is known as and will be referred to as a dropout. In most, but not all configurations, tubes will extend from the dropout forward. A typical (but not limited to) configuration incorporates a lower set of tubes constructing an arm member known as the chainstay arms and an upper set of tubes known as the seatstay arms and/or a variety of links or members, consisting of, or not, bearings, bushings, axles, links and/or clamps and other possible apparatus to provide rotation.

Figure 15:
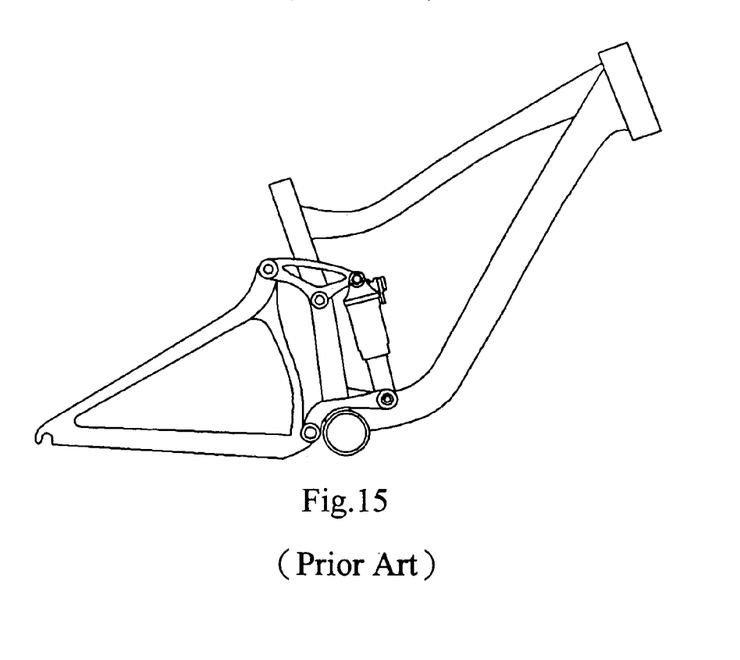
FIG. 15 shows a conventional bicycle rear suspension system.

FIG. 15 discloses another conventional suspension system known to applicant. Shown is the front section known as a front triangle and a rear section known as a rear triangle. The rear triangle is connected to the front triangle using any number of connection methods which may or may not employ bearings, bushings, axles, clamps and flexible links. A shock absorption unit is connected between the front and the rear to allow the rear to move at a regulated rate with regard to the front. Any number of different connection methods for controlling the rate of movement can be used. However, the connection of the shock absorbing unit at the main frame shares a point of attachment which is also considered the main triangle main or lower pivot. The front section is typically but not in all cases comprised of a tube which carries the seat, a tube which carries the steering apparatus, and a tube which carries a crank assembly. These three tubes are connected together in any number of different ways to form the front section. The front section general prior art may have a single point of connection between the two (front and rear) or multiple points of connection using any number of different connection methods and pivot and or link configurations. However, such pivot location does not include the use of bearings affixed into the section known as the front triangle. The rear section is typically comprised of a location to mount a wheel, considered in most cases the rear wheel, a place to mount to the front section consisting or not of bearings, bushings, axles, standard links and flexible links. This can be a single location or multiple dependant on the design, however specifically does not use a clamping mechanism that clamps to an axle or shaft which extends through the front section. Moreover, the bearings, or bushings or other means of providing rotation (or other means of housing that means of rotation) are not housed, or are a part of the front triangle.

Figure 16:
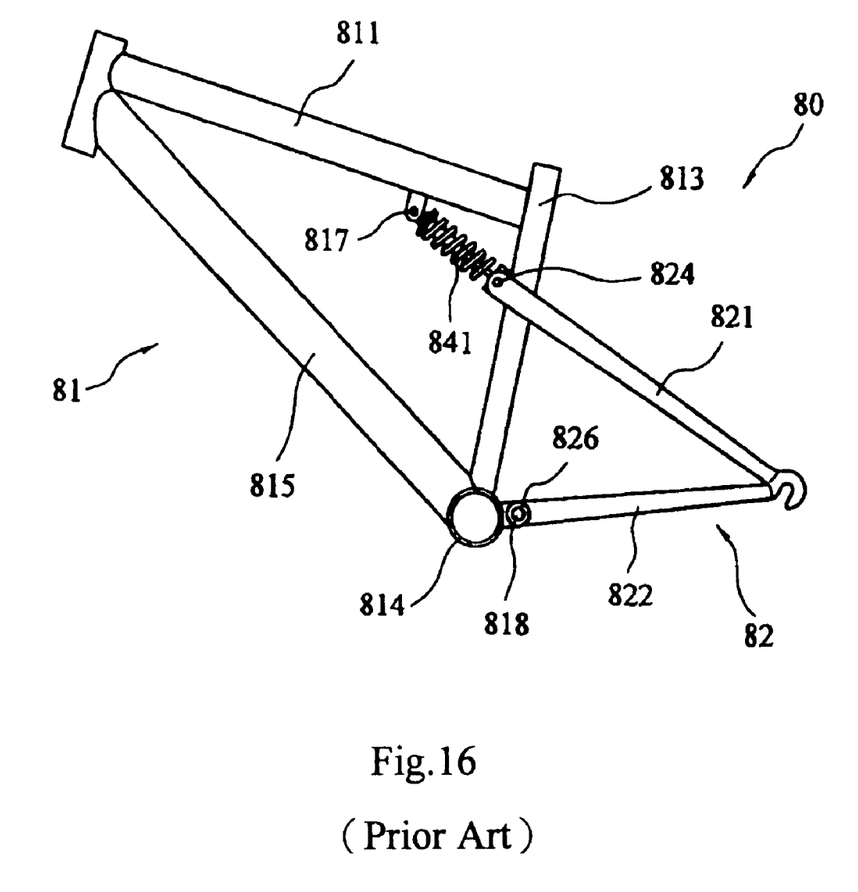
FIG. 16 shows a conventional bicycle rear suspension system.

FIG. 16 discloses another conventional suspension system 80 for bicycles, and includes a front part 81, a rear part 82, and a shock absorbing unit 83. The front part 81 includes a top tube 811, a down tube 815, and a seat tube 813 connected to two respective second ends of the top and down tubes 811, 815. A bottom bracket 814 is connected to the second end of the down tube 815 and the lower end of the seat tube 813. The rear part 82 includes two seat stays 821 and two chainstays 822. Two second ends 826 of the two chain stays 822 are pivotally connected to the rear of the bottom bracket 814 at the pivot point 818. A shock absorbing unit 84 has one end pivotally connected to a pivot point 817 under the top tube 811. The other end of the first cylinder 841 is pivotally connected the two second ends of the seat stays 821 at pivot point 824.

When shocks are transferred to the rear wheel of the bicycle, the rear part 82 is pivoted about the pivot point 818 and the two second ends of the seat stays 821 are pivoted about the pivot point 824 so that the cylinders 841 are operated to absorb the shocks.

SUMMARY OF THE INVENTION

The present invention relates to a bicycle rear suspension system which comprises a front part, a rear part and a shock absorbing unit. The front part includes a top tube, a down tube and a head tube which is connected to two respective first ends of the top and down tubes. A seat tube is connected to two respective second ends of the top and down tubes respectively. A bottom bracket is connected to the second end of the down tube and a lower end of the seat tube. The rear part includes two seat stays and two chain stays which have two dropouts on first ends thereof. The seat stays have first ends pivotally connected to the dropouts. Two second ends of the two seat stays are pivotally connected to a first pivot of a connection member at a pivot point. Two second ends of the chain stays are pivotally connected to the front part. A second pivot of the connection member is pivotally connected the front part. The shock absorbing unit includes a cylinder which has a first end pivotally connected to the front part and a second end pivotally connected to a portion of the connection member at a pivot point. The rear part is pivoted relative to the front part and the connection plate applies a force to operate the cylinder to absorb the shocks.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 7, a bicycle rear suspension system of the present invention comprises a front part 10, a rear part 20 and a shock absorbing unit 30. The front part 10 includes a top tube 12, a down tube 13 and a head tube 11 which is connected to first ends of the top and down tubes 12, 13. A bottom bracket is connected to a second end of the down tube 13 so as to be connected to a crank which is not shown. A protrusion 15 extends from a lower edge of the front part 10 and a bridge 32 is connected to the bottom bracket and the down tube 13.

The rear part 20 includes two seat stays 21 and two chain stays 22 which have two dropouts on first ends thereof so as to be connected with an axle of the rear wheel (not shown). The seat stays 21 have first ends pivotally connected to the dropouts and two second ends of the two seat stays 21 are pivotally connected to a first end of a connection member 33 at a first pivot point 35. The connection member 33 is composed of two plates between which the protrusion 15 is located. Two second ends of the chain stays 22 extend forward toward the front part. Second ends of the chainstays 22 are pivotally connected to the bridge 32 of the front part 10 using an axle 39. The pivot 34 of the connection member 33 is pivotally connected to the protrusion 15 of the front part 10 using an axle 41. The pivot point 36 will be described hereinafter.

The shock absorbing unit 30 includes a cylinder 31 which is located within an area enclosed by the front part 10 and has a first end pivotally connected to the bridge 32 of the front part 10 using the axle 39 and a second end of the cylinder 31 is pivotally connected to a mediate portion of the connection member 33 at a second pivot point 36.

Figure 5:
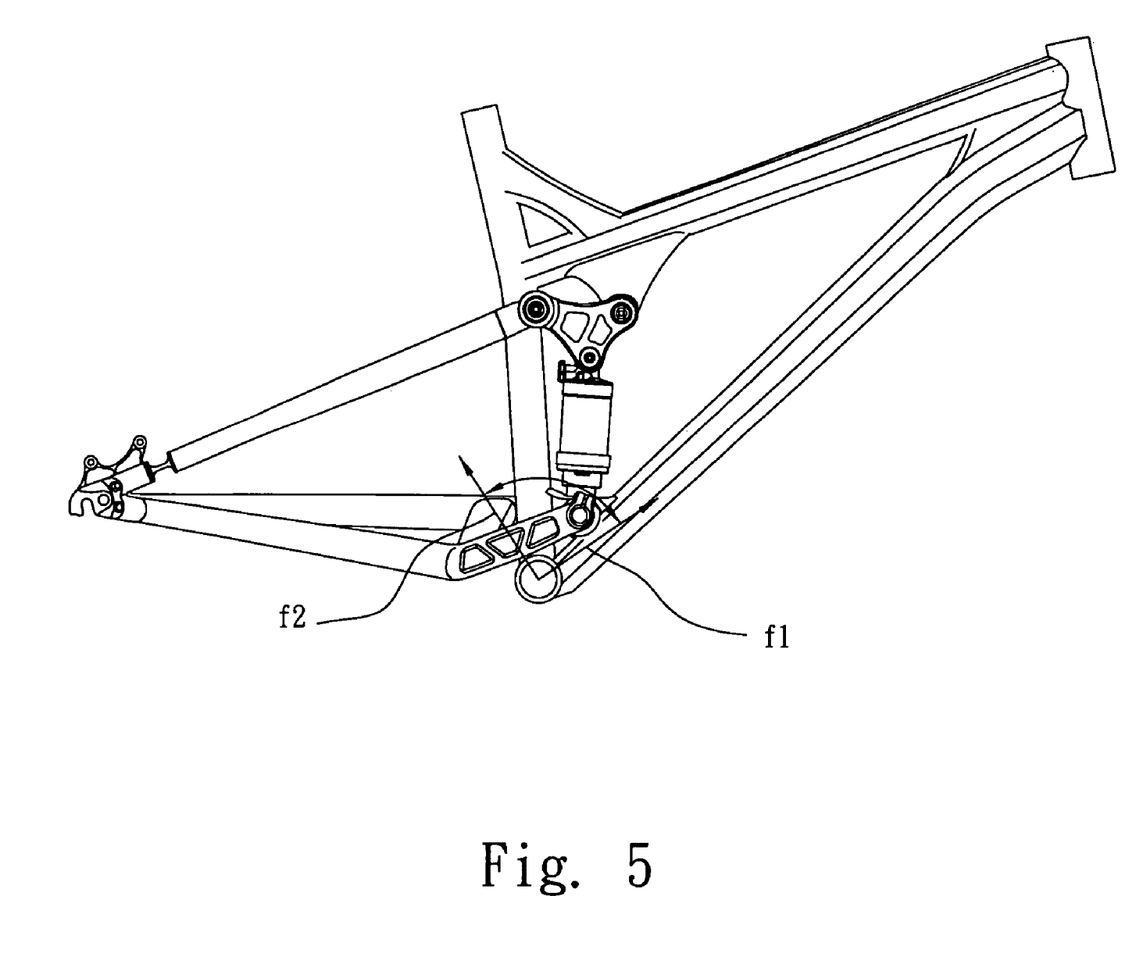
FIG. 5 shows general upward forces that counteract rider downward forces at the bottom bracket.
Figure 6:
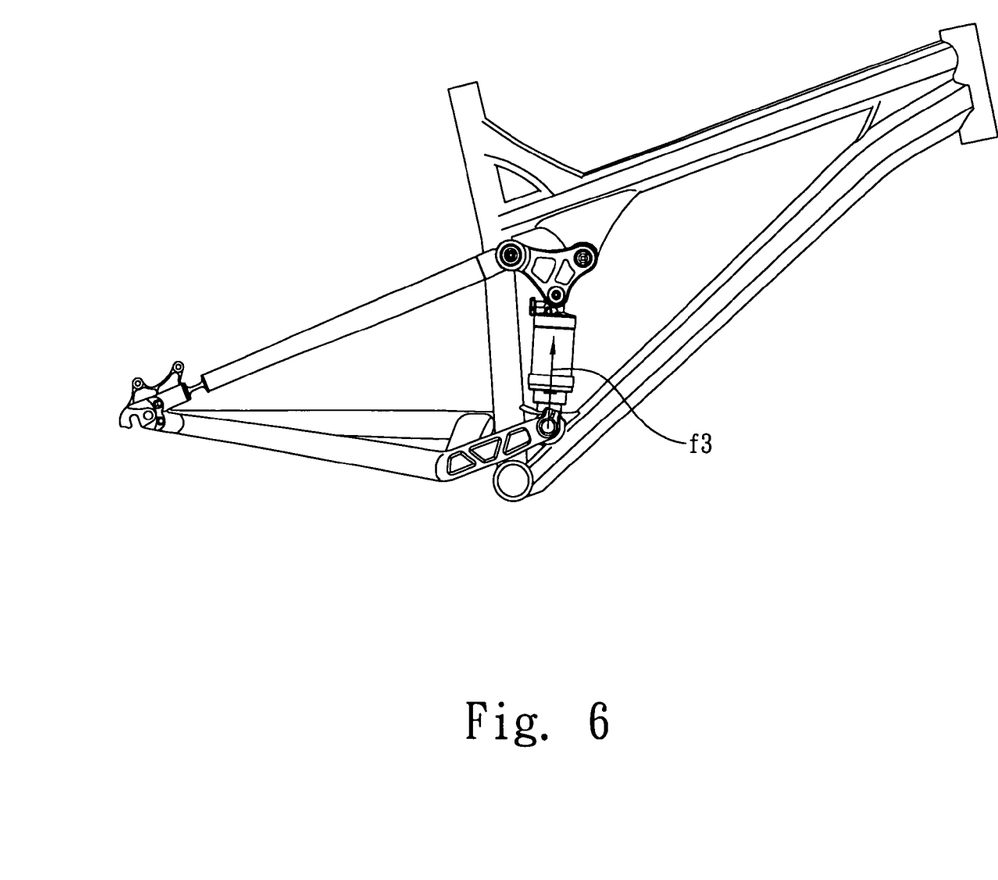
FIG. 6 shows the extension forces of the shock.
Figure 7:
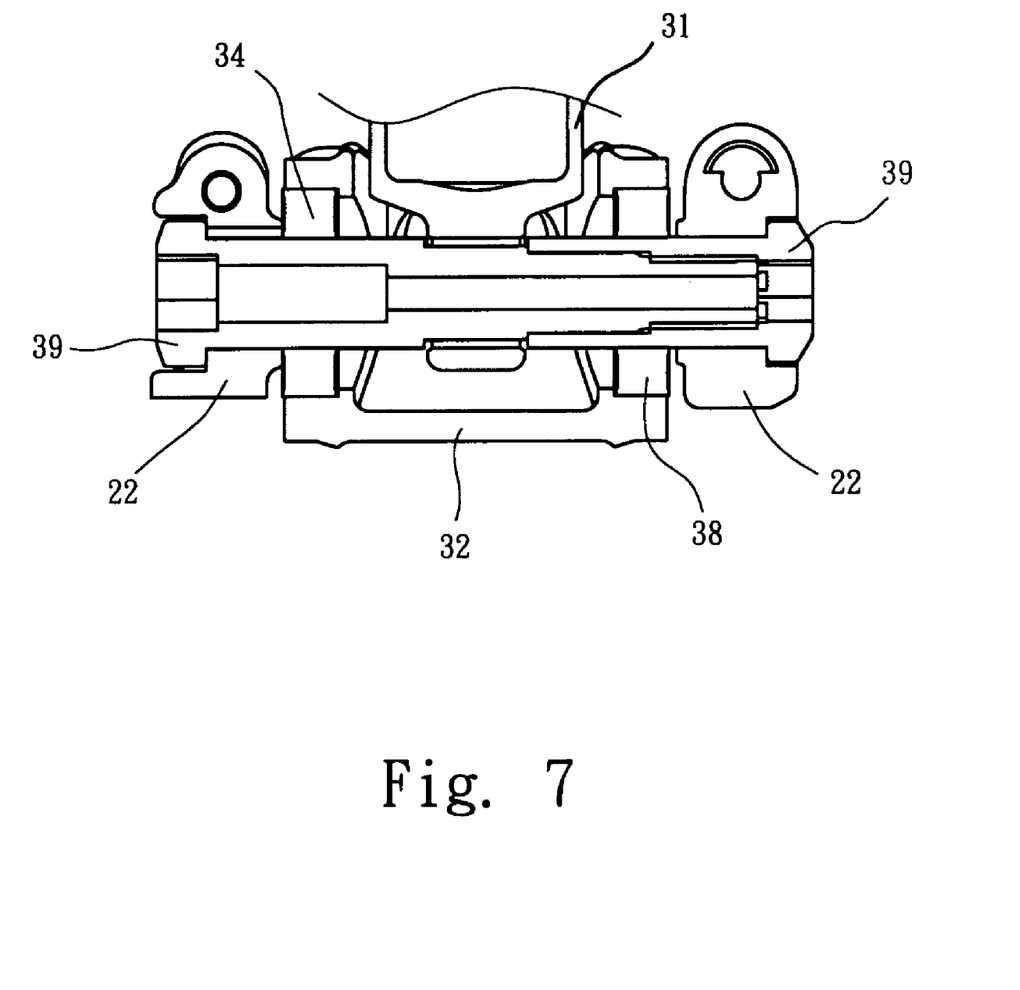
FIG. 7 shows the bearings set between the chain stays and cylinder.
Figure 8:
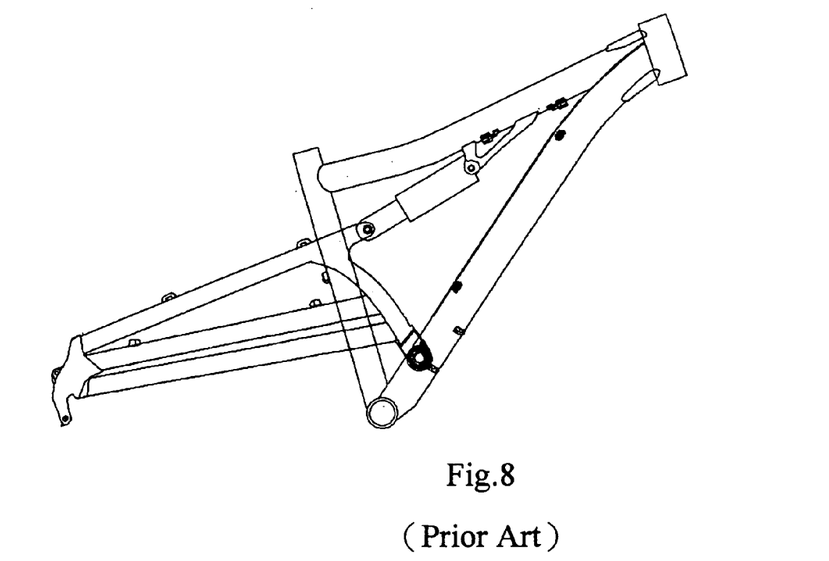
FIG. 8 shows a conventional bicycle rear suspension system.
Figure 9:
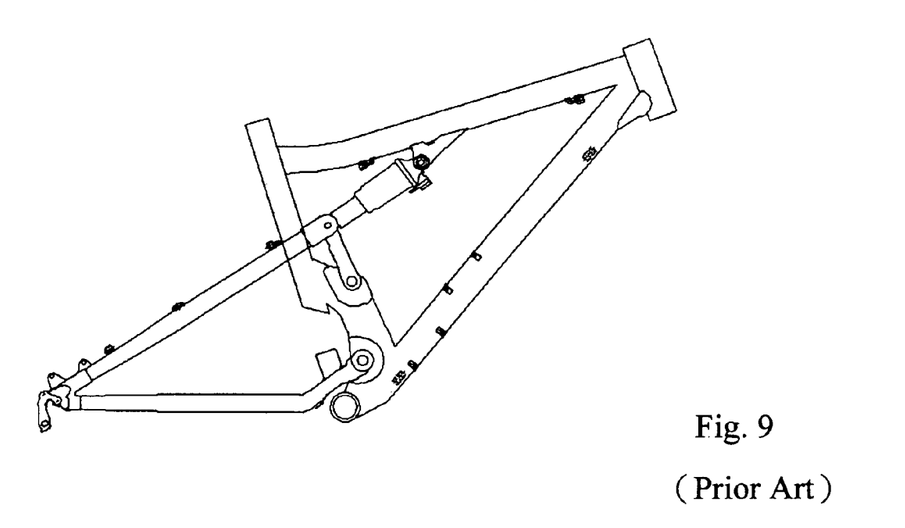
FIG. 9 shows a conventional bicycle rear suspension system.
Figure 10:
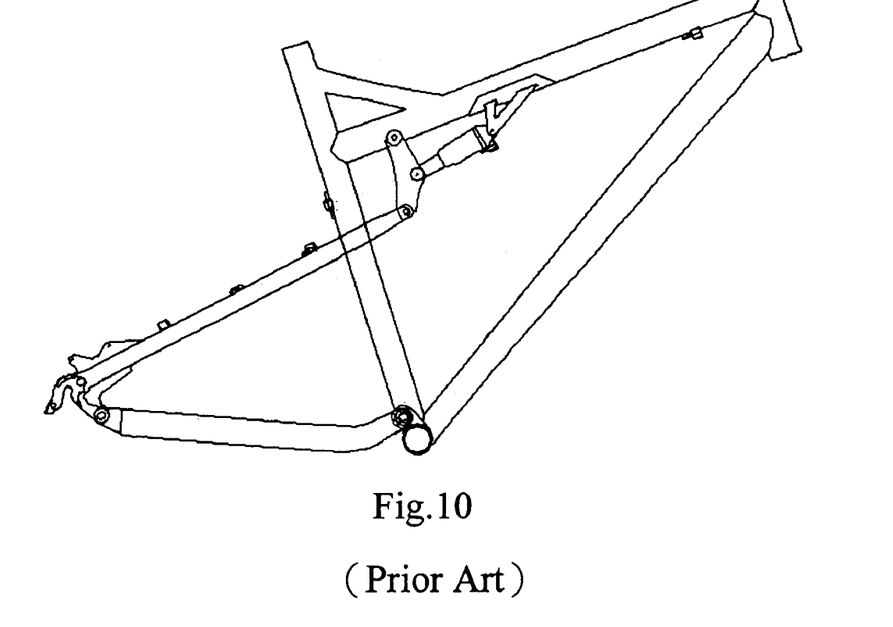
FIG. 10 shows a conventional bicycle rear suspension system.
Figure 11:
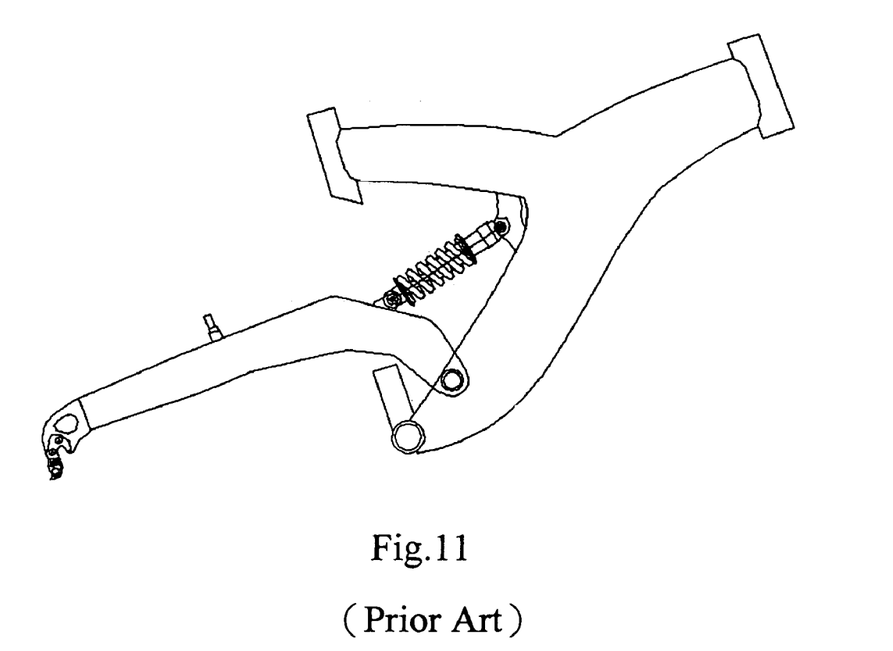
FIG. 11 shows a conventional bicycle rear suspension system.

When shocks are transferred to the rear wheel, the rear part 20 is pivoted about the connection point of the chain stays 22 and the bridge 32, the seat stays 21 pivot the connection plate 33 about the third pivot point 34, and the mediate portion of the connection plate 33 applies an upward force f3 to operate the cylinder 31. The force f3 is shown in the FIG. 6. The cylinder 31 and the movement of the rear triangle act to absorb the shock and do not transfer shock to the front part 10 and the rider. Shown in FIG. 5, are force f1 and force f2, between which a general range of upward force would be.

Figure 1:
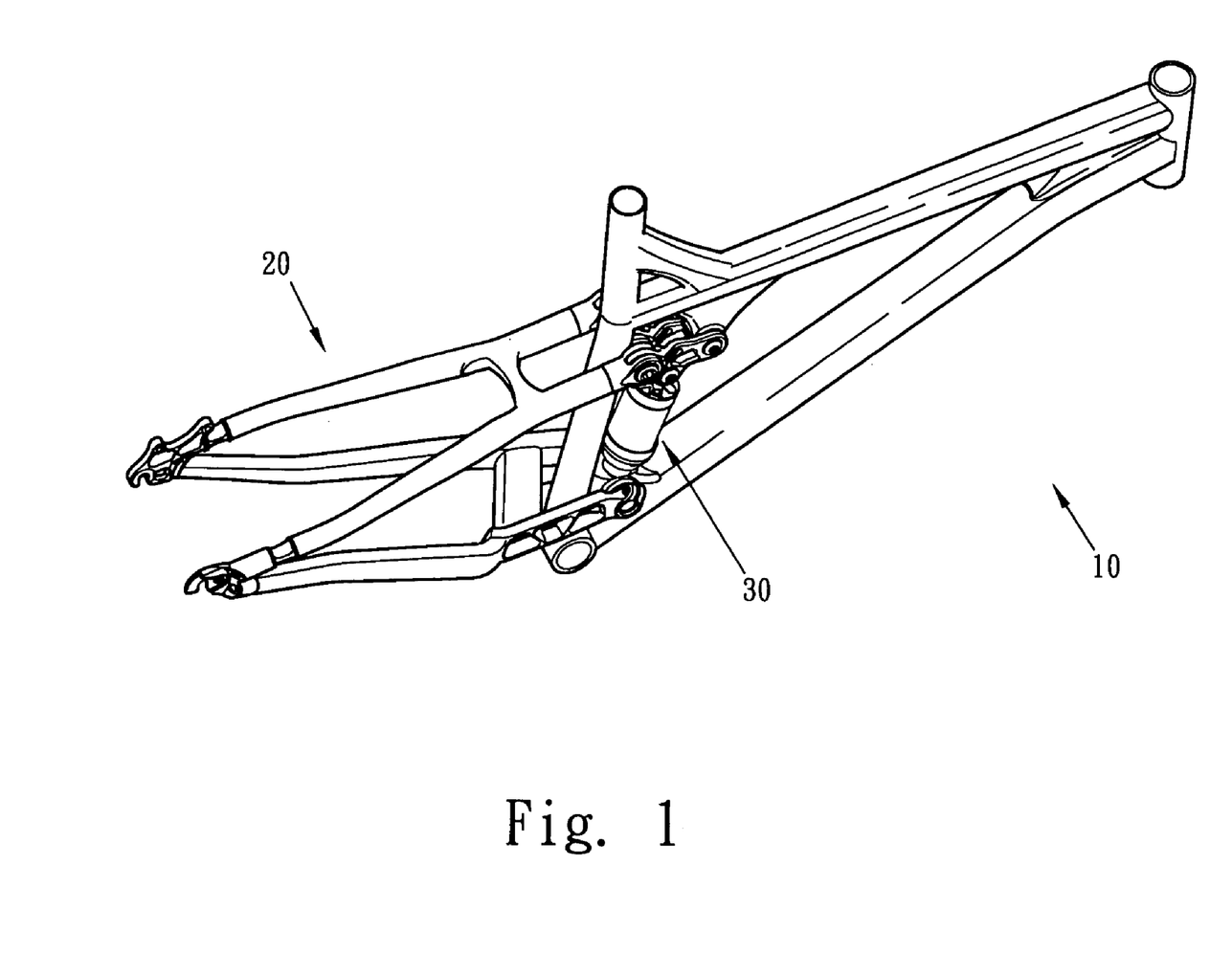
FIG. 1 is a perspective view to show the bicycle frame with the rear suspension system of the present invention.
Figure 2:
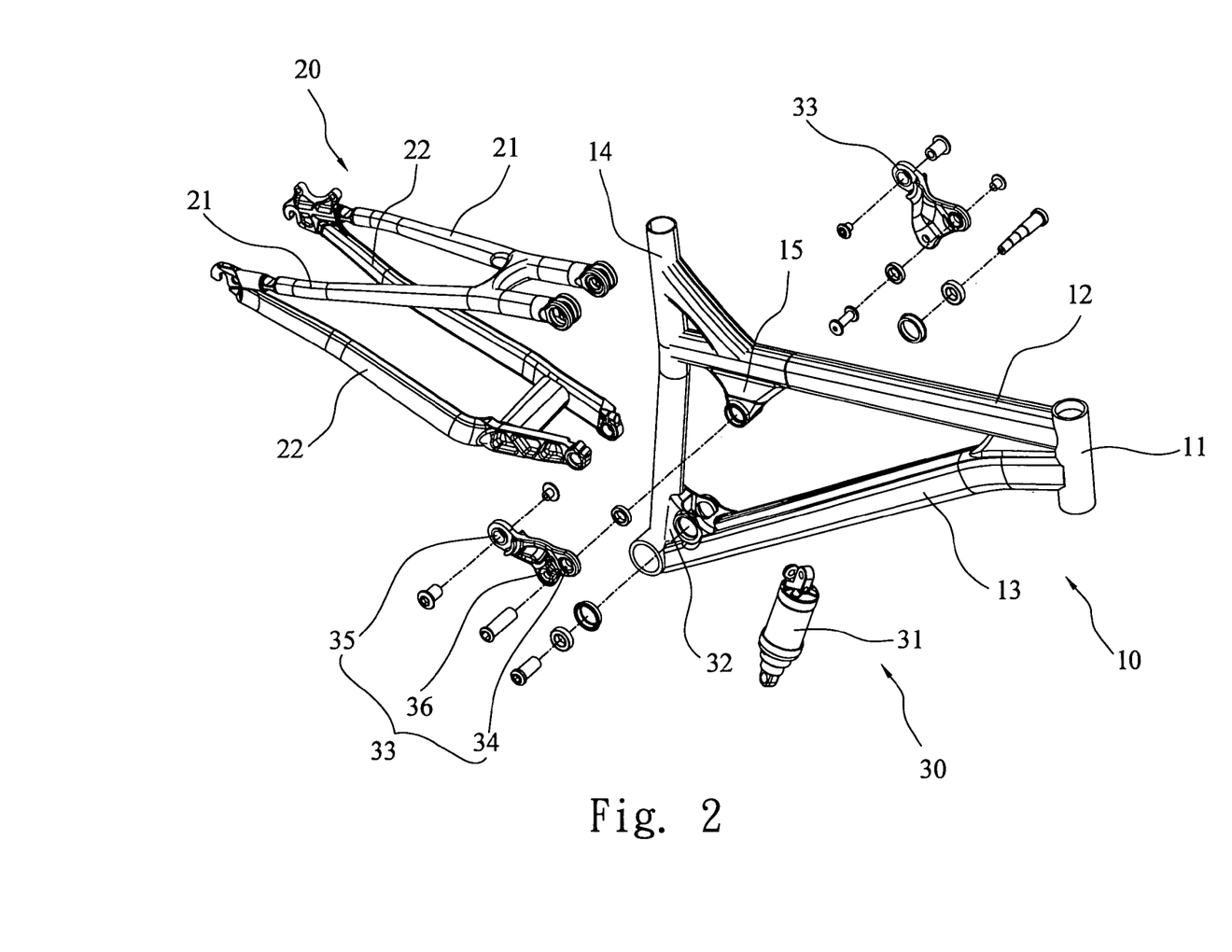
FIG. 2 is an exploded view to show the bicycle frame with the rear suspension system of the present invention.
Figure 3:
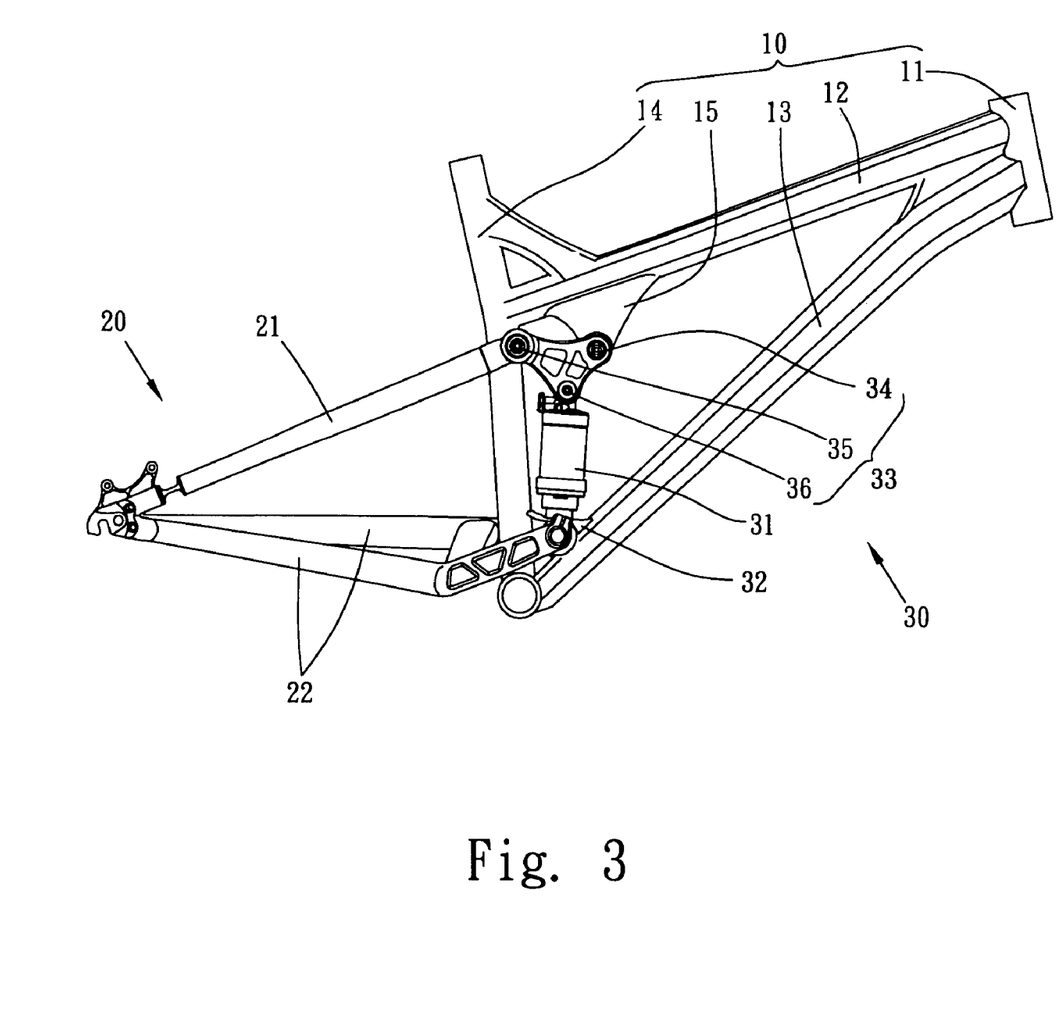
FIG. 3 is a side view to show the bicycle frame with the rear suspension system of the present invention.
Figure 4:
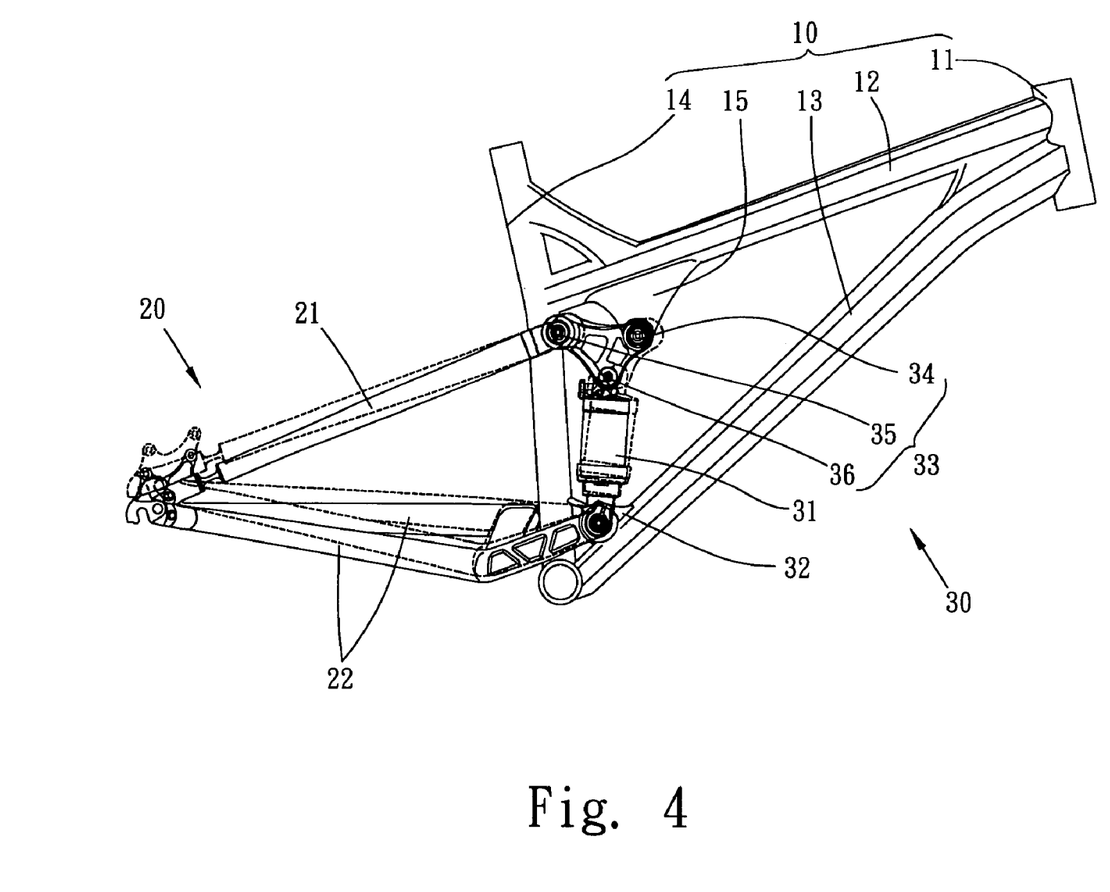
FIG. 4 shows that the rear part is pivoted relative to the front part and the rear suspension system of the present invention is activated.

As shown in FIG. 2, two bearings 38 are located between ends of the chainstay 22 and mounted in the bridge 32, part of the front triangle 10. Located at the end of the chainstays 22 are two clamping mechanisms 40. The axle 39 is located through the clamping mechanisms 40 at the ends of the chainstays 22, through the two bearings 38 and through the shock absorber end. This pivotal location is known as the main pivot of the system.

The rear suspension system of the present invention requires a fewer number of parts and welding points so that the manufacturing and assembly costs are reduced.

While we have shown and described the embodiment in accordance with the present invention, it should be clear to those skilled in the art that further embodiments may be made without departing from the scope of the present invention.

What is claimed is:

1. A bicycle frame comprising:
   a front part; and
   a rear suspension system including:
      a connection member connected pivotally to said front part;
      a rear part including two seat stays having front ends connected pivotally to said connection member at a location spaced from said pivotal connection to said front part to define a first moment arm of said connection member, and two chain stays having front ends;
      a cylinder having an upper end and a lower end, said upper end being pivotally connected to said connection member at a location spaced from said pivotal connection to said front part and spaced from said pivotal connection to said front parts of said two seat stays to define a second moment arm of said connection member; and
      an axle extending through said front part at a location spaced from said pivotal connection to said connection member, said front ends of said chain stays, and said lower end of said cylinder for pivotally connecting said front ends of said chain stays and said lower end of said cylinder to said front part; wherein an upward displacement of said rear part about said axle relative to said front part pivots said first moment arm upwardly and thereby pivots said second moment arm upwardly to apply an upward force on said upper end of said cylinder.

2. The bicycle frame as claimed in claim 1, further comprising at least one bearing disposed between said front part and said axle.

3. A bicycle frame comprising:
   a front part having a top tube extending between a head tube and a seat tube and a down tube extending between said head tube and a bottom bracket, said top tube having a protrusion extending therefrom and said down tube being coupled to a bridge adjacent to said bottom bracket; and
   a rear suspension system including:
      a connection member connected pivotally to said protrusion;
      a rear part including two seat stays having front ends connected pivotally to said connection member at a location spaced from said pivotal connection to said protrusion to define a first moment arm of said connection member, and two chain stays having front ends connected pivotally to said bridge,
      a cylinder having an upper end and a lower end, said upper end being pivotally connected to said connection member at a location spaced from said pivotal connection to said protrusion and spaced from said pivotal connection to said front ends of said two seat stays to define a second moment arm of said connection member, said lower end being pivotally connected to said bridge with said front ends of said chain stays such that, when said rear part is pivoted upwardly relative to said front part, said first moment arm is pivoted upwardly and thereby pivots said second moment arm upwardly to apply an upward force to said upper end of said cylinder, and
      an axle extending through said bridge, said front ends of said chain stays, and said lower end of said cylinder for connecting said front ends of said chain stays and said lower end of said cylinder pivotally thereto.

4. The bicycle frame as claimed in claim 3, further comprising at least one bearing disposed between said bridge and said axle.

5. A bicycle frame comprising:
   a front part; and
   a rear suspension system including:
      a connection member connected pivotally to said front part at a first end thereof;
      a rear part including two chain stays and two seat stays, said two seat stays being pivotally coupled to said connection plate at a second end thereof, said second end being longitudinally spaced from said first end to define a first moment arm;
      a cylinder having an upper end and a lower end, said upper end being pivotally connected to said connection member at a location laterally spaced from said first moment arm and angularly offset with respect to said pivotal connections of said connection member to said front part and said connection member to said two seat stays to define a second moment arm, wherein an upward displacement of said rear part relative to said front part pivots said first moment arm upwardly and thereby pivots said second moment arm upwardly to apply an upward force on said upper end of said cylinder;
      an axle extending through said front part, said front ends of said chain stays, and said lower end of said cylinder for connecting said front ends of said chain stays and said lower end of said cylinder pivotally to said front part; and
      at least one bearing disposed between said front part and said axle.

* * * * *